US012008008B2

(12) United States Patent
Chakra et al.

(10) Patent No.: US 12,008,008 B2
(45) Date of Patent: *Jun. 11, 2024

(54) CONTEXTUAL DATA VISUALIZATION

(71) Applicant: International Business Machines Corporation, Armonk, NY (US)

(72) Inventors: Al Chakra, Apex, NC (US); John Feller, Cary, NC (US); Trudy L. Hewitt, Cary, NC (US); Kerry A. Moffo, Zebulon, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/128,923

(22) Filed: Dec. 21, 2020

(65) Prior Publication Data

US 2021/0109923 A1   Apr. 15, 2021

Related U.S. Application Data

(63) Continuation of application No. 14/688,741, filed on Apr. 16, 2015, now Pat. No. 10,963,475, which is a
(Continued)

(51) Int. Cl.
*G06F 16/24* (2019.01)
*G06F 3/04842* (2022.01)
(Continued)

(52) U.S. Cl.
CPC ........ *G06F 16/248* (2019.01); *G06F 3/04842* (2013.01); *G06F 16/26* (2019.01); *G06F 16/904* (2019.01)

(58) Field of Classification Search
CPC ..................................................... G06F 16/248
(Continued)

(56) References Cited

U.S. PATENT DOCUMENTS 6,078,924 A    6/2000   Ainsbury
6,995,768 B2   2/2006   Jou
(Continued)

FOREIGN PATENT DOCUMENTS

WO     2009154484 A2    12/2009

OTHER PUBLICATIONS

Sean Kandel et al; "Wrangler: Interactive Visual Specification of Data Transformation Scripts"; ACM Human Factors in Computing Systems; CHI May 7-12, 2011; Vancouver, BC Canada; 2011; 10 pages.

*Primary Examiner* — Syling Yen
(74) *Attorney, Agent, or Firm* — Stephen R. Yoder

(57) ABSTRACT

A method for contextual data visualization includes receiving data selected by a user and meta-data associated with the data. The data is analyzed, using a processor of a computing device, to determine content and structure attributes of the data that are relevant to visualization of the data. The meta-data is analyzed, using a processor of the computing device, to determine a context in which the visualization of the data will be used. A database comprising an aggregation of visualization records from a plurality of users is accessed and at least one template from the data visualization records that matches the data attributes and context is selected. A data visualization is created by applying at least one template to the data.

20 Claims, 12 Drawing Sheets

Related U.S. Application Data continuation of application No. 13/280,720, filed on Oct. 25, 2011, now Pat. No. 9,058,409.

(51) Int. Cl.
  *G06F 16/248* (2019.01)
  *G06F 16/26* (2019.01)
  *G06F 16/904* (2019.01)

(58) Field of Classification Search
  USPC ........................................... 707/805
  See application file for complete search history.

(56) References Cited

U.S. PATENT DOCUMENTS

| | | | |
|---|---|---|---|
| 7,016,919 B2 | 3/2006 | Cotton | |
| 7,705,847 B2 | 4/2010 | Helfman | |
| 7,840,896 B2 | 11/2010 | Tien | |
| 7,880,749 B2 | 2/2011 | Favart | |
| 8,122,016 B1 | 2/2012 | Lamba | |
| 8,423,889 B1* | 4/2013 | Zagorie | G06F 16/9577 715/255 |
| 8,862,646 B1 | 10/2014 | Murayama | |
| 8,963,969 B2 | 2/2015 | Hao | |
| 2003/0154442 A1 | 8/2003 | Papierniak | |
| 2004/0119752 A1* | 6/2004 | Beringer | G06Q 10/06313 715/779 |
| 2004/0181543 A1 | 9/2004 | Wu | |
| 2006/0218563 A1 | 9/2006 | Grinstein | |
| 2007/0133522 A1* | 6/2007 | Morgan | H04L 43/06 370/352 |
| 2008/0005677 A1 | 1/2008 | Thompson | |
| 2008/0288889 A1 | 11/2008 | Hunt | |
| 2008/0294996 A1 | 11/2008 | Hunt | |
| 2009/0222721 A1 | 9/2009 | Parkinson | |
| 2010/0049686 A1 | 2/2010 | Gotz | |
| 2010/0070448 A1 | 3/2010 | Omoigui | |
| 2010/0199181 A1* | 8/2010 | Robertson | G06Q 30/02 715/709 |
| 2010/0312803 A1 | 12/2010 | Gong | |
| 2010/0325076 A1 | 12/2010 | Paulk | |
| 2011/0029853 A1 | 2/2011 | Garrity | |
| 2011/0047507 A1 | 2/2011 | Urbalejo | |
| 2011/0191343 A1 | 8/2011 | Heaton | |
| 2011/0202557 A1 | 8/2011 | Atsmon | |
| 2012/0117473 A1* | 5/2012 | Han | H04N 1/00148 715/723 |
| 2012/0144325 A1 | 6/2012 | Mital | |
| 2012/0221503 A1* | 8/2012 | Williamson | G06F 17/17 706/47 |
| 2013/0031470 A1* | 1/2013 | Daly, Jr. | G06F 40/103 715/243 |
| 2013/0033523 A1 | 2/2013 | Stovicek | |
| 2013/0046771 A1 | 2/2013 | Moitra | |
| 2013/0097544 A1 | 4/2013 | Parker | |
| 2013/0226318 A1 | 8/2013 | Procyk | |
| 2015/0127565 A1* | 5/2015 | Chevalier | H04W 4/21 705/319 |

\* cited by examiner

Data Visualization Database 130

| Visualization Templates | Data Characteristics | Meta-Data |
|---|---|---|
| Template 126<br>Chart Type<br>　　Sub type<br>Series<br>Lines<br>　　Color<br>　　Weight<br>　　Type<br>Legend<br>　　Text<br>　　Placement<br>Titles<br>　　Font<br>　　Style<br>Shading<br>Axes<br>Gridlines<br>Data labels<br>　　.<br>　　.<br>　　. | Template 126<br>Columns<br>　　Content<br>　　Value type<br>Rows<br>　　Content<br>　　Value type<br>Text/Keywords<br>Titles<br>Labels<br>　　.<br>　　.<br>　　. | Template 126<br>Identity of User<br>IP address<br>Computer name<br>Audience<br>Application<br>Date/day of week<br>Industry<br>Organization<br>　.<br>　.<br>　. |
| Template 127 | Template 127 | Template 127 |
| Template 128 | Template 128 | Template 128 |
| .<br>.<br>. | .<br>.<br>. | .<br>.<br>. |

*Fig. 2*

Corporate Sales

|  | Fred | Wilma | Barney | Betty |
|---|---|---|---|---|
| March | 33 | 47 | 58 | 63 |
| April | 45 | 76 | 45 | 42 |
| May | 65 | 53 | 32 | 42 |
| June | 84 | 69 | 21 | 42 |

*Fig. 3A*

Sales Record

| Date | Location | Type | Salesman | Item | Inventory | Shipped | Billed |
|---|---|---|---|---|---|---|---|
| 23-Mar | Chicago | B2B | Wilma | Item XXXX | 197 | 28-Mar | 28-Mar |
| 23-Mar | Pheonix | Internet | Fred | Item XXXX | 196 | 28-Mar | 28-Mar |
| 23-Mar | Atlanta | Retail | Betty | Item XXXX | 195 | 29-Mar | 28-Mar |
| 24-Mar | Portland | Internet | Fred | Item XXXX | 194 | 29-Mar | 28-Mar |

*Fig. 3B*

CONTEXTUAL DATA VISUALIZATION

BACKGROUND

The present invention relates to data visualization, and more specifically, to automatic contextual data visualization based on data mining and analysis. A wide variety of events and characteristics are captured as electronic data. For example, a business person may use electronic data to track sales, markets, products, and supply chains. Analysis of the electronic data can bring additional insight into the systems and events the electronic data represents. However, electronic data in its raw form may not be easily understood. Data visualization, such as charts, graphs, and animations, can present the data in a more intuitive format. Further, data visualization allows for interpretation and presentation of the data to emphasize desired characteristics. However, the business person may not be aware of the optimal way to present the data or may not have time to create an optimal visualization.

SUMMARY

According to one embodiment of the present invention, a method for contextual data visualization includes receiving data selected by a user and meta-data associated with the data. The data is analyzed, using a processor of a computing device, to determine content and structure attributes of the data that are relevant to visualization of the data. The meta-data is analyzed, using a processor of the computing device, to determine a context in which the visualization of the data will be used. A database comprising an aggregation of visualization records from a plurality of users is accessed and at least one template from the data visualization records that matches the data attributes and context is selected. A data visualization is created by applying at least one template to the data.

An analytics engine includes a computer processor and a memory accessible by the computer processor. The analytics engine also includes an interface module for receiving a data visualization request, the data visualization request comprising data and meta-data describing a context of the request. A database includes records of data visualization by multiple users, each record comprising: templates, descriptions of data visualized, and meta-data associated with the data. A data analysis module analyzes the content of the data and analyzes meta-data to discover the context of the request. The data analysis module also selects a template with descriptions of data and meta-data that most closely matches the data and meta-data in the data visualization request. A visualization applies at least one template to the data to automatically create a data visualization.

A computer program product for contextual data visualization includes a computer readable storage medium having computer readable program code configured to receive a request for data visualization, the request comprising data and related meta-data and to access a database comprising an aggregation of visualization records from a plurality of users. The computer readable program code is also configured to compare the data and meta-data with the visualization records to determine which visualizations are suited to the data and context of the request and to apply a visualization template to the data to produce data visualization.

An illustrative method includes recording use of templates stored in a database by a plurality of users by recording in the database: characteristics of visualizations used by the plurality of users, characteristics of the data supplied by the plurality of users and meta-data in visualization requests received from the plurality of users. A visualization request is received from a user. The visualization request includes data selected by a user and meta-data associated with the data, in which the meta-data comprises the identity of the user, applications being used by the user, system properties such as date/time, and information related to the audience of the visualization request. The data is analyzed using a processor of a computing device to determine content and structure attributes of the data that are relevant to visualization of the data. The meta-data is analyzed using a processor of the computing device to determine a context in which the visualization of the data will be used. Templates stored in the database are accessed and ranked according to a degree of correspondence between the data and meta-data in the visualization request from the user and data and meta-data associated with the templates. The template with the highest rank is selected and data visualization is created by applying the selected template to the data. Post creation meta-data that describes how the user modified and used the data visualization is transmitted and recorded. The post generation meta-data is stored in the database so that future visualization requests consider these recent user selections when identifying an optimal visualization template.

BRIEF DESCRIPTION OF THE SEVERAL VIEWS OF THE DRAWINGS

The accompanying drawings illustrate various examples of the principles described herein and are a part of the specification. The illustrated examples are merely examples and do not limit the scope of the claims.

FIG. 2 illustrates the kind of data and meta-data stored within a data visualization database in order for data mining and analytics engines to retrieve data and identify the optimal visualization template to be used for a set of data and meta-data.

FIGS. 3A and 3B show illustrative data that may be visualized using a system for contextual data visualization, according to one example of principles described herein.

Throughout the drawings, identical reference numbers designate similar, but not necessarily identical, elements.

DETAILED DESCRIPTION

Figure 1A:
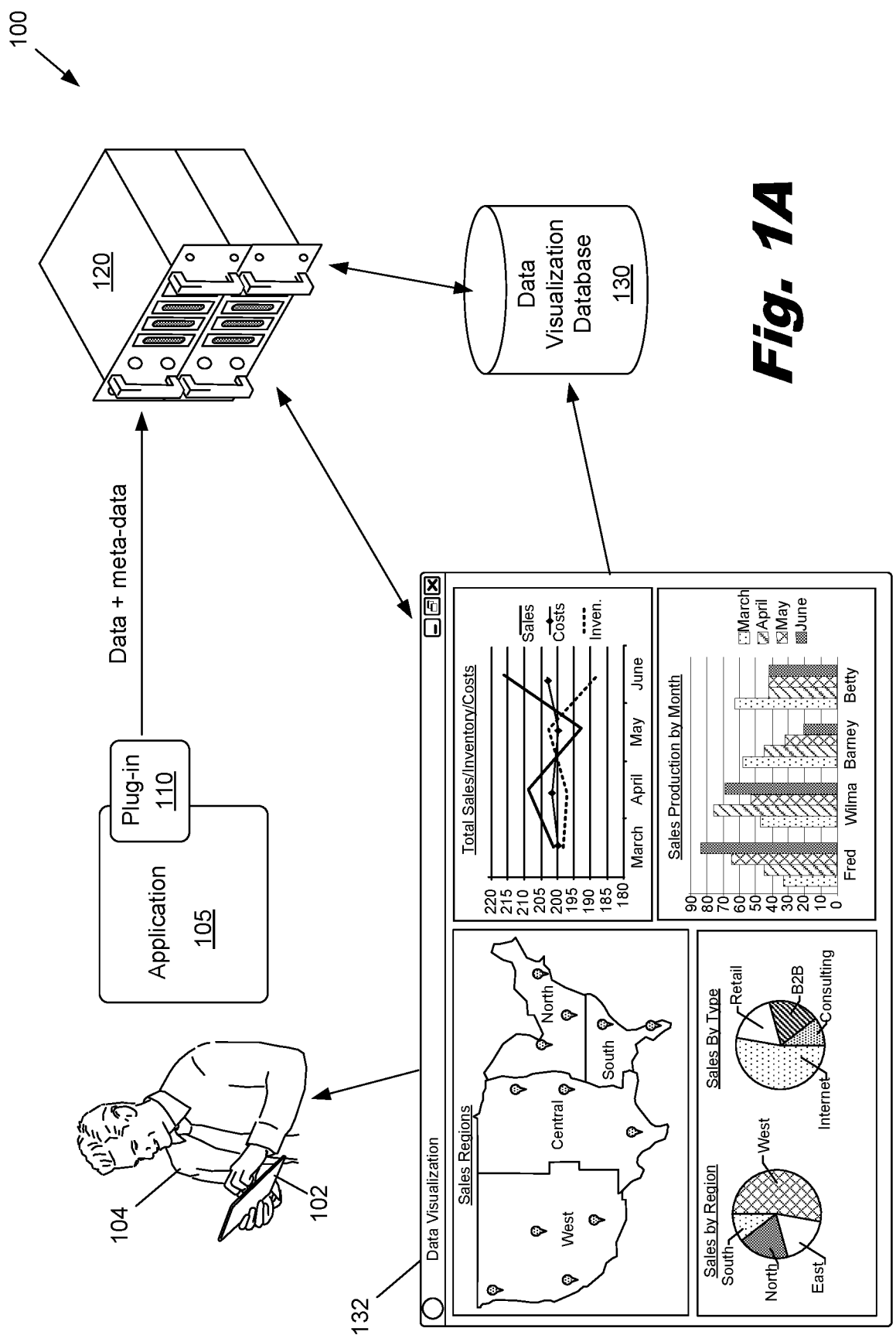
FIG. 1A is a diagram of an illustrative system for contextual data visualization, according to one example of principles described herein.

The present specification discloses systems and methods for contextual data visualization. The contextual data visualization is automatically generated in response to a selection of data by the user. The selected data along with related meta-data is sent to an analytics engine where the context of the request is discovered by analyzing the data structure, meta-data, and other information. Based on results of the analysis, one or more data visualization templates are selected and applied to the data. The resulting data visualizations are presented to the user for selection and use. By discovering the context in which the data will be used, templates can be selected that visually present the data in conformity to best practices and are highly comprehensible to the target audience. In some embodiments, the majority of the computation is performed by a remote device, while the user provides data and makes selections using a less capable mobile device. This allows the user to visualize a wide range of data without burdening the user's mobile device with the extended operation of data manipulation software.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, or other code executed on a computer processor, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language, or written in scripting languages such as JavaScript. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1A is a diagram of an illustrative system (100) for contextual data visualization. In this example, a business person (104) uses a computing device (102) to open an application (105) and access data. The application (105) could be any of a number of computer programs, including web browsers, email clients, database software, spreadsheets, presentation software, and document editing applications. In some implementations, a specialized visualization plug-in (110) may be associated with the application (105). For example, a spreadsheet application may have the visualization plug-in (110) on the tool bar. After highlighting a portion of the data, the user clicks on the visualization plug-in (110). The visualization plug-in (110) accepts the data, obtains related meta-data, and sends the data and meta-data to an analytics engine (120).

The use of a visualization plug-in (110) is only one method for implementing automatic view creation using data mining. A variety of other methods could be used. For example, a user could copy selected data into a web page for transmission to the analytics engine. In other instances, the user could indicate a particular task, such as "creation of an end of the quarter sales report." A data visualization application could then access the various data files to extract the information and send it to the analytics engine.

The meta-data that accompanies the data could include a wide variety of information that would assist the analytics engine (120) to present the data in a visually effective and accurate manner. For example, the meta-data may include the date, the day of the week, time of day, underlying equations or references, headers, information from adjacent cells if the data is in a spreadsheet, other applications that are open when the request was made, the identity of the user, the role of the user, the organization/department of the user, the intended audience and other information. This meta-data can be obtained a variety of ways and can include past information, information that is gathered when the request is made and data gathered after the request is made. In one implementation, plug-ins that gather meta-data may be present in a wide variety of programs including email, web browser, spreadsheets, database, presentation software and other programs. For example, a user may have downloaded information from a database in response to an email request. In this example, meta-data that may be useful in making in selecting visualization template may include the identity and role of the person making the email request, keywords from the request, the identity/role of the user requesting visualization, information about the database, and other information.

Using this information, an analytics engine (120) can recognize the role-based task and database activity of the user. The analytics engine (120) tool can then use the data and the meta-data to access a data visualization database (130). The data visualization database (130) stores a variety of information about past usage of data visualization that may be relevant to the current request. The records in the data visualization database may include various characteristics of the visualization, the structure and content of the data, and a listing of meta-data related to the visualization.

A variety of other information may also be included in the database. For example, the data visualization database may include a history of data visualizations used by a particular organization or user. The database (130) may record the time that various visualizations are used by a sales vice president within a particular organization. Each month, the sales vice president creates a summary presentation for the president and board members of his organization. Every quarter, the sales vice president creates a more in depth analysis of the past sales, costs, and sales projections for the next quarter. Consequently, when the vice president selects data and requests visualization at the beginning of each month, the analytics engine is informed by the database (130) which templates have been historically used by the vice president or others for this type of summary presentation. The analytics engine (120) analyzes the data and metadata and determines the best template to apply for the specific situation. For example, the analytics engine (120) may score the retrieved templates with a confidence level, format the data to fit within the templates and presents the user with an automatically generated data visualization (132) that match one or more of the templates.

In other embodiments, the analytics engine may present user with a series of images that represent the top visualization choices and allow the user to select the image. For example, the analytics engine (120) may create images of data visualizations using the three top template matches ranked by confidence level. These data visualizations are then presented to the user for review and selection.

The data visualization may be presented in a variety of ways including image files, presentation slides, or graphs within a spreadsheet. For example, if the meta-data indicates that the user (102) has a PowerPoint presentation open, the analytics engine may determine that the best format to present the data visualization is in a PowerPoint slide. If a spreadsheet application is open, the analytics engine may automatically create a graph and insert it as a picture file into the spreadsheet or use the spreadsheet functionality to create a graph matching the template. For example, the analytics engine (120) may preset some or all of the options for in a graphing module that is native to the spreadsheet. The user can then simply click on the "Finish" button to create the desired graph, or the user can modify the settings as desired prior to modify the data visualization.

The user's selections and finished data visualization product are recorded and transmitted to the analytics engine (120). The user's request, data characteristics, and meta-data are then stored in the data visualization database (130). If the data visualization product is not substantially similar to a template already in the data visualization database, a new template may be made, tagged with the associated metadata and stored in the database library (130). When the user wants to create other data visualizations, the user's previous data visualizations will be available. Because users tend to make routine requests, the previous data visualizations may result in a substantial reduction in labor and time. Further, the data visualization database (130) may store organization specific templates. For example, an organization may use a specific logo, header or format in data visualizations. When the analytics engine determines that a specific organization is requesting data visualization, the analytics engine may select templates or portions of templates that contain the organization specific elements.

Figure 1B:
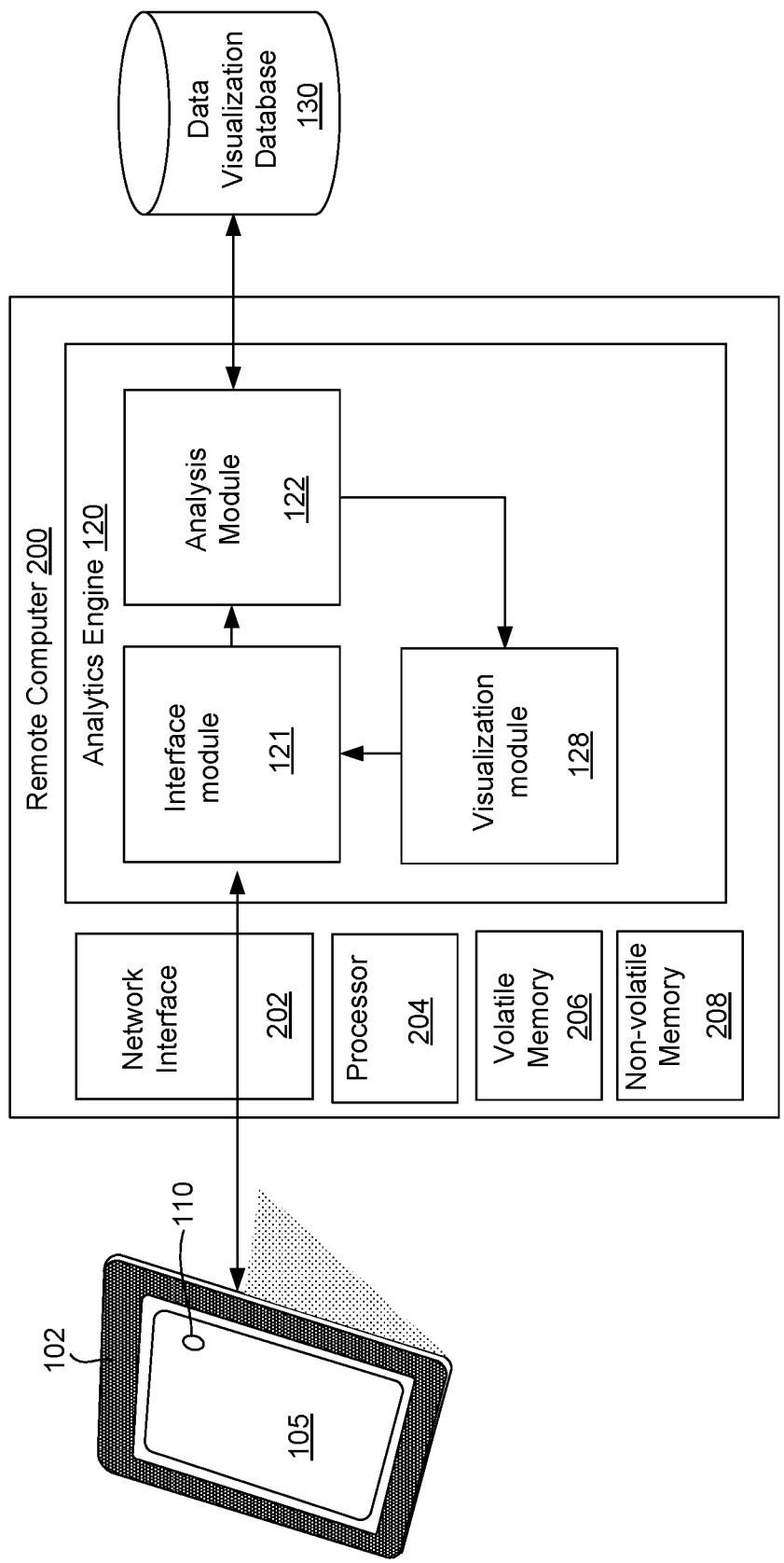
FIG. 1B is a diagram of an illustrative system for contextual data visualization showing modules and components within an analytics engine, according to one example of principles described herein.

FIG. 1B is a diagram showing modules and components of a system for contextual data visualization in greater detail. The user's computing device (102) is shown on the left. In this example, the computing device (102) is running an application (105) with a plug-in (110). The user makes a request for data visualization using the computing device (102) by activating the plug-in (110).

In this example, the analytics engine (120) and its various modules (121, 122, 128) are hosted by a remote computer (200). The remote computer (200) includes a network interface (202), a processor (204), a volatile memory (206) and a non-volatile memory (208). The user's computing device (105) sends the selected data and meta-data through a network to the interface (202). The interface (202) directs the data and meta-data to the analytics engine (120). An interface module (121) accepts the data and meta-data and logs the transaction. The interface module (121) then passes the data and meta-data to an analysis module (122).

The analysis module (122) determines the structure and content of the data. Using this analysis, the module (122) can provide weighting factors that rank the relevance of templates stored in the data visualization database (130). For example, a user chooses two data fields (ex: two columns within a spreadsheet or database). For two variables, a visualization could be a simple XY (scatter) chart, a line chart, or a bar chart. Consequently, the data analysis module would provide weightings or other indications that templates with these types of visualizations should be considered. If the first field is non-numeric and the second field is numeric, then a pie chart could be determined to be the optimal visualization. However if there are large number of rows, then there would be too many fields to display within a single pie chart, so a better visualization recommendation could be a horizontal bar chart or a bubble chart. Also the data analysis module (122) may evaluate the title of the columns against other data visualizations. If the first column title is "Time", "Date", "Month", or "Quarter (1Q, 2Q)" and the second field is numeric, then a line chart could be recommended.

The analysis module (122) also assesses the available meta-data and may request additional meta-data. For example, if the identity of the user (104, FIG. 1A) is not in the meta-data, the analysis module (122) may send a request for this information through the interface module (121). Based on the meta-data analysis, the analysis module (122) further refines the ranking of relevant templates stored in the data visualization database (130). As discussed above, the data visualization database (130) contains records of prior interactions with users requesting data visualization. For example, if the identify of the user is known, the analysis module (122) can increase the rank of templates that the user has accessed in the past. If one of the recommendations of the analysis module (122) is for a pie chart, the meta-data analysis module could determine what constitutes "too many rows" of data for this particular user. The data analysis module (122) could determine the maximum number of rows the user has ever included in a pie chart and use this as the limit for recommending a pie chart. Additionally, the analysis module (122) could look at use of pie charts by other users to determine if there is a consensus or statistical limit to the number of entries that are acceptable in a pie chart. There may also be a number of "industry standard" best practices. Consequently, if the meta-data includes indications of which industry the user is preparing the chart for, the analysis module (122) may increase the rank or score of templates that conform to the appropriate industry standard. The analysis module (122) may also determine which pieces of meta-data are most relevant. Those pieces of meta-data that are more relevant, such as more recent decisions and preferences by the user, may be given higher weightings.

The data and the recommended ranked/scored templates are passed from the analysis module (122) to the visualization module (128). The visualization module (128) applies the highest ranked visualization template to the data and automatically produces a first data visualization. The first data visualization is passed through the interface module (121) to the user.

If the user is not satisfied with the first data visualization, the visualization module (128) can apply the second highest ranked visualization template to produce a second data visualization. This visualization is also passed to the user. This can be continued until a predetermined number of data visualizations have been passed to the user or the user selects a specific visualization. In some embodiments, several visualizations may be passed to the user at once in recommended priority order and then allow the user to choose a visualization.

FIG. 2 is a graphical representation of illustrative records stored in the data visualization database (130). In this example each record has a visualization template component, a data characteristics component and a meta-data component. The record for "Template 126" includes a visualization template that lists characteristics needed to create the visualization. These characteristics may include the chart type, data series, lines, legends, titles, shading, axes, etc. It also may include characteristics of the data types such whether the data in a column are integers, decimal (floating point) numbers, dates, time, currency, percentage, or text. FIG. 2 shows a non-exhaustive list of these characteristics.

The data characteristics component lists characteristics of the data that was graphed using the template. For example, the data characteristics may include the number of columns visualized, the content of the column, and, for numeric data, the value type (i.e. floating point, integer, negative, fraction, equation, etc.). Similar information is stored for the rows. Additionally, text/keywords, titles, labels, and other information contained in the data set can be included. These stored data characteristics allow provide information about what data was visualized in the past with this template. When a data request is received, the analysis module determines which of the data characteristics are present in the data set that accompanies the data request. The higher the similarity between the listed data characteristics and the data set, the higher the template is scored.

The meta-data component can include a wide variety of information that provides additional context about situations in which the template was used. For example, the meta-data component may include the identity of the user or user(s) who created or used the template, the IP address of the computing device making past requests, the intended audience of the visualization, the application in which the visualization was presented to the audience, and other relevant information. This meta-data information is compared to the meta-data received in the visualization request. The higher the similarity between the listed meta-data characteristics and the meta-data in the visualization request, the higher the template is scored.

The data visualization database (130) is a dynamic, rather than a static, repository. As users make data requests and accept/modify data visualizations, this information is added to the database. For example, the identity and role of users that make requests fulfilled with a particular template can be added to the meta-data component. This may allow for determination of group or industry consensus over best practices for data visualization. More popular templates could be ranked higher when the meta-data is relevant. For example, if the requester is a vice-president of sales, and 80% of vice presidents selected "Template 126" when presenting similar data, then "Template 126" could rank as a first choice with a high degree of confidence.

FIGS. 3A-8 show an example of a simplified data set and specific examples the data visualizations derived from the data set. FIG. 3A shows a matrix of corporate sales that is available to a sales vice president. The matrix includes a listing of the months in the first column and four salespeople along the top row. The sales of each salesperson for each month are shown as numbers in the matrix.

The matrix of corporate sales shown in FIG. 3A is derived from the sales record shown in FIG. 3B. FIG. 3B contains additional data related to each sale that was made. In this example, the sales date is listed in the first column. Other columns may include the sales location, sale type, the salesperson who made the sale, the item that was sold, inventory level, shipment dates, and other data. The data represented in FIGS. 3A and 3B may be stored in a variety of formats and locations. In one example, the sales record is automatically updated on one page of a spreadsheet and the sales matrix is linked to and derived from the sales record.

In this example, the vice president has sent out a sales meeting request to all the salespeople and wants to present a slide showing total sales of each of the salespeople and their progress toward a sales quota. The vice president determines that the data in FIG. 3A best represents that salespeople's progress towards the sales quota and wants to present this data to the salespeople he supervises. However, there are a wide variety of ways that the data in FIG. 3A could be presented. The vice president may be unaware of the optimal or industry standard data presentation for this particular situation. Consequently, the vice present eventually creates the graph shown in FIG. 4.

Figure 4:
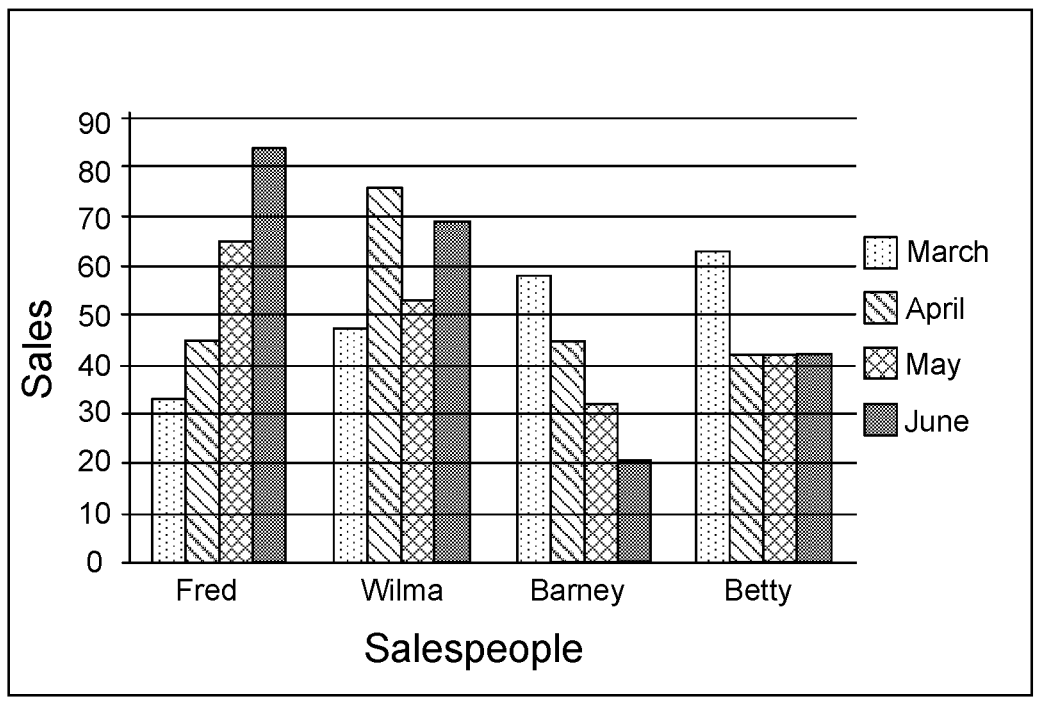
FIGS. 4-7 are illustrative graphs generated by a system for contextual data visualization, according to one example of principles described herein.

FIG. 4 is a vertical bar chart that shows the sales for each salesperson for during of the past four months. The vertical axis shows the number of sales and the names of each of the salespeople are listed along the horizontal axis. Various color coded bars represent the sales by each salesperson. While this graph accurately represents the data shown in FIG. 3A, it may not be the optimal data visualization to convey the salespeople's progress toward a quota or their progress relative to their peers.

Figure 5:
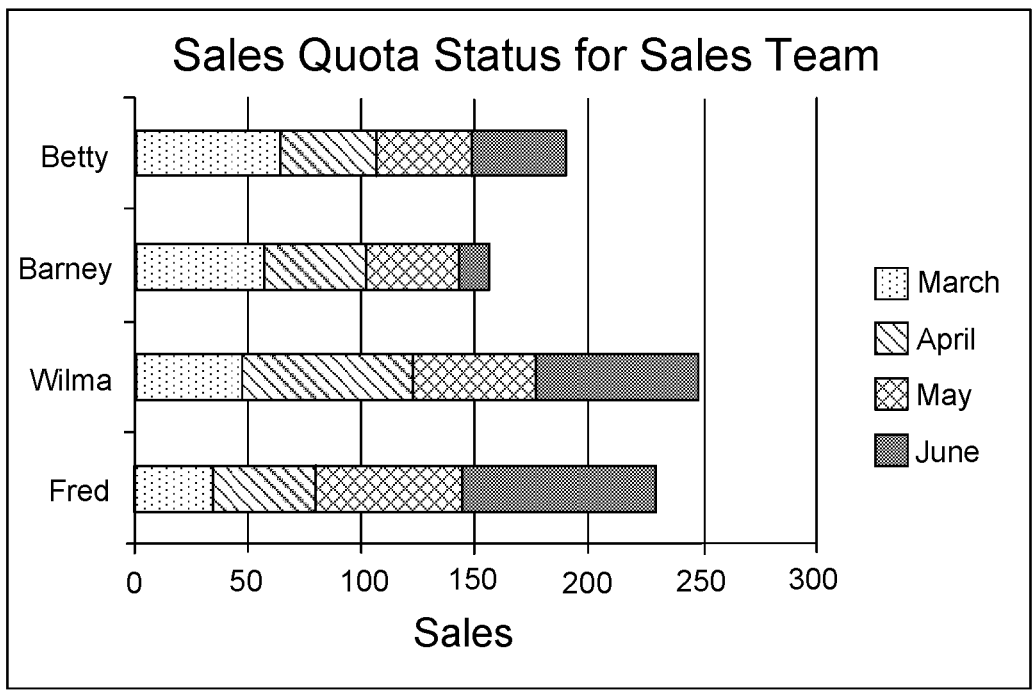
Figure 6:
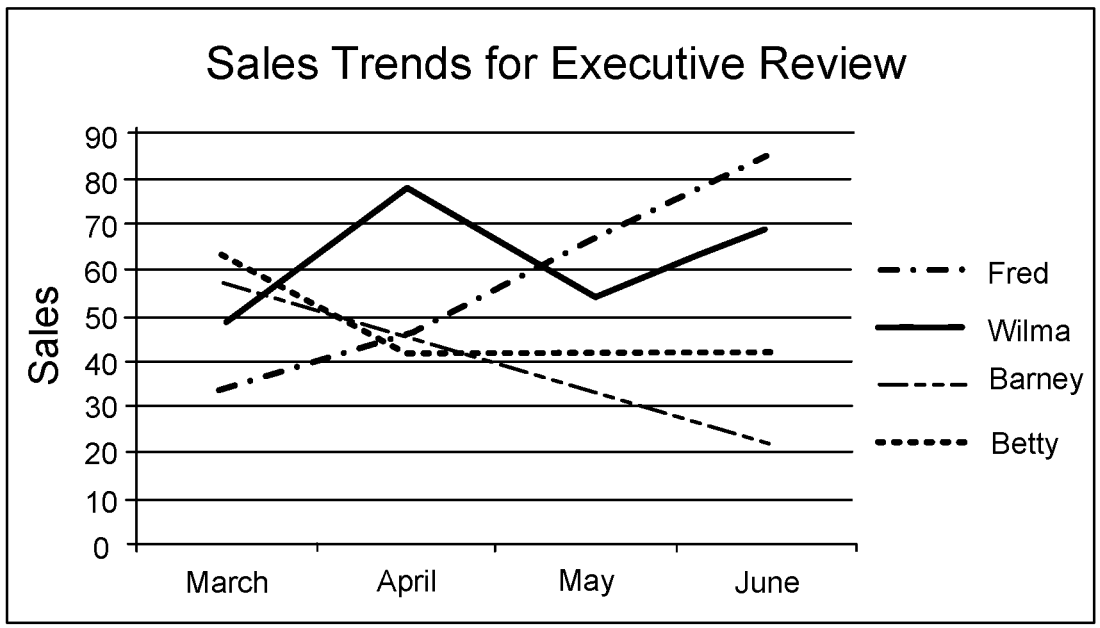

FIG. 5 shows a data visualization that results when the vice president utilizes a plug-in and analytics engine for contextual data visualization. The vice president selects all or part of the numeric data shown in FIG. 3A and then clicks on the plug-in icon on the menu bar of his spreadsheet application. The plug-in identifies the data and collects metadata. In this instance, the plug-in identifies the organization, the vice president and that an email conversation is ongoing between the vice president and various salespeople to set up a sales meeting. From information contained in the spreadsheet, the plug-in identifies the names of the salespeople, the names of the months, and that the data in FIG. 3A is derived from the sale record data shown in FIG. 3B.

The plug-in sends this information to the analytics engine. The analytics engine analyzes the data and associated metadata and accesses the data visualization database. The analytics engine recognizes that this organization has used an industry standard template for sales meetings in the past and that the data set closely corresponds to the past data sets graphed with the standard data template. The analytics engine downloads this template from the database and sends the template and the data set to the visualization module. The visualization module formats the data using the template and adds additional data, such as the names of the sales people and the months. FIG. 5 represents the data as visualized with the template. The names of the sales people are distributed along the vertical axis and the cumulative number of sales is shown across the horizontal axis. A single horizontal bar for each salesperson extends from the vertical axis to the cumulative number of sales at the end of the time period for each salesperson. The horizontal bars are shaded so that the sales for individual months can be readily ascertained. By presenting the data in this way, the salespeople have a visual and clear way of determining how close they are to the sales quota and how their production relates to the production of other salespeople.

However, in different circumstances, the same user may desire the same data to be presented differently. For example, the vice president may have a quarterly meeting with the president and board to review the performance of his personnel. The president and the board want to review the overall trend of sales for each salesperson. In this case, the meta-data sent to the analytics engine may indicate an appointment on the user's electronic calendar for the upcoming meeting. This allows the analytics engine to understand who the participants of that meeting are, as well as the reoccurring nature of the meeting. The analytics engine can then access the data visualization database to determine which data visualizations were used by this vice president in the previous meeting with the president and directors. In this case, the analytics engine determines that the template for the previous data visualization calls for the data to be presented in the line graph format shown in FIG. 6. The vertical axis of the line graph shows the number of sales in a given month and the horizontal axis shows time in months. Lines that represent the performance of each of the salespersons are shown on the graph. Using this data visualization the president and directors can easily determine the trend in sales for each salesperson. For example, Fred has a strongly upward sales trend, while Barney has a strongly downward sales trend.

Figure 7:
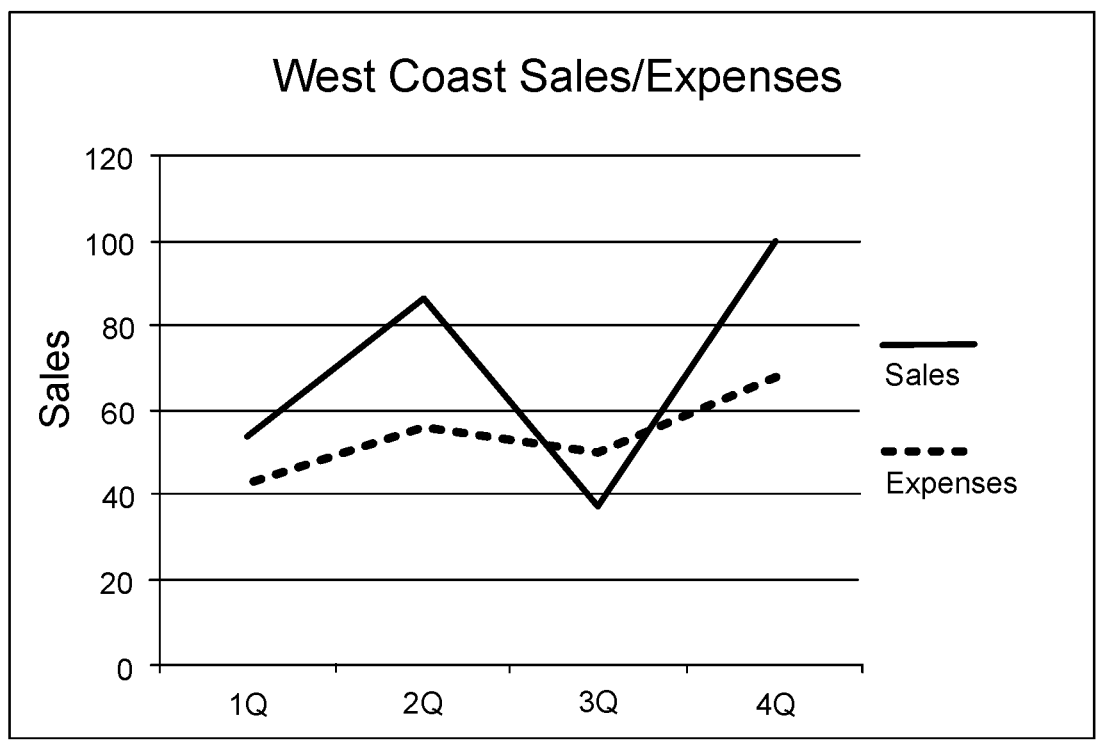

A variety of other data visualizations can also be created. In some circumstances the analytics engine may not graph all of the selected data and/or may include data that has not been included in the selection. In the example shown in FIG. 7, the vice president has selected a summary of sales for the whole company over an entire fiscal year. From the metadata, the analytics engine determines that the vice president is probably speaking with a west coast manager. Consequently, the analytics engine determines that some of the data may not be relevant and presents a number of templates to the user that include only sales data for the west coast. The user selects a template that graphs only the sales in the west coast manager's district. However, the template also calls for a graph of expenses to also be shown. This data was not in the data selected, so the analytics engine instructs the plug-in to obtain expense data. The plug in may attempt to access the spreadsheet to find the expense data or may contact the user to supply the desired data. FIG. 7 shows the graph produced for the meeting between the vice president and the west coast manager. On the vertical axis, the sales in the west coast are shown. On the horizontal axis the quarters in the fiscal year are shown.

Figure 8:
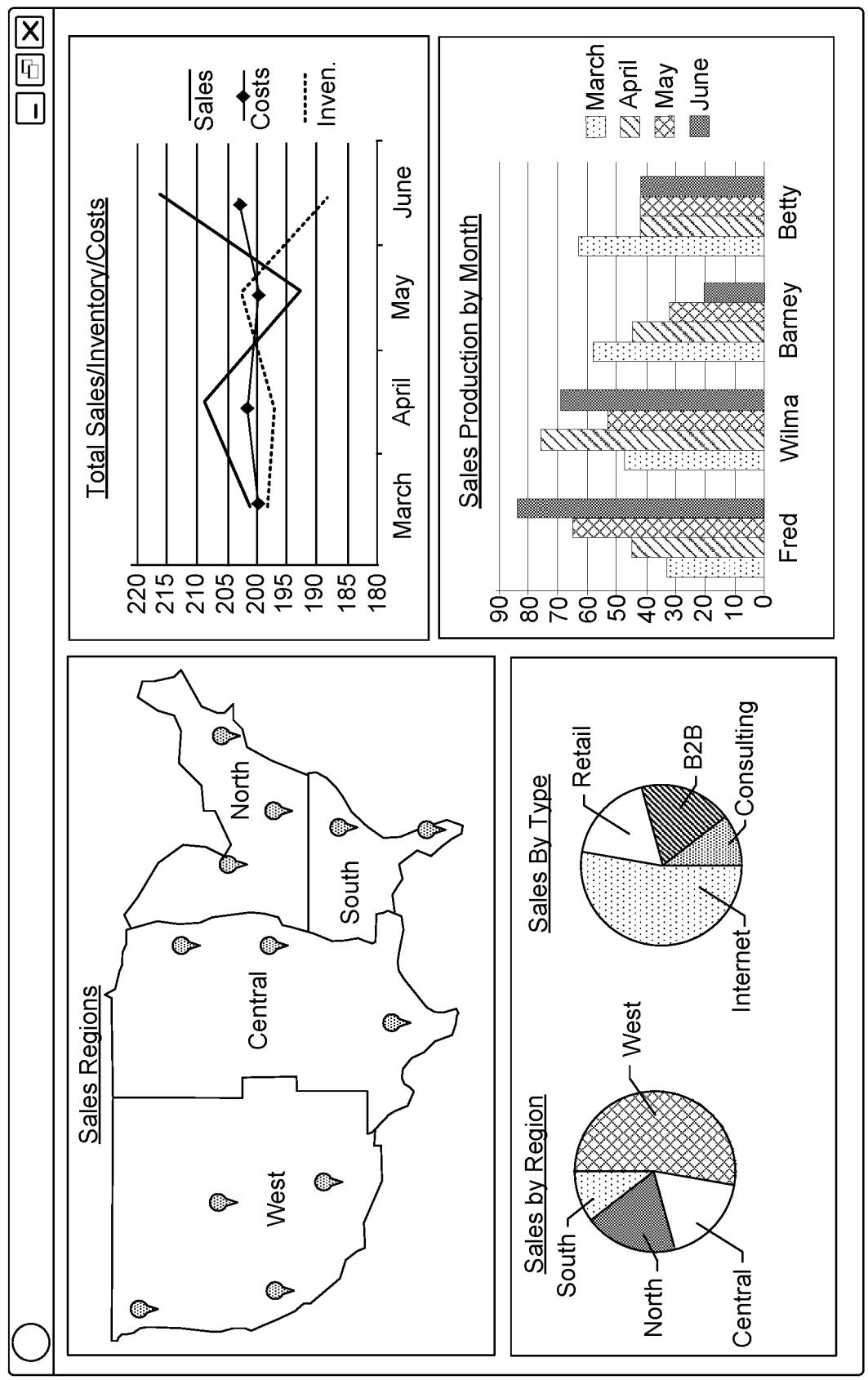
FIG. 8 is an illustrative multicomponent visualization generated by a system for contextual data visualization, according to one example of principles described herein.

FIG. 8 shows a more comprehensive visualization of data generated by the analytics engine for the vice president's quarterly report. In this data visualization, a first panel shows the geographic location of sales offices in the United States. Below the sales regions, pie charts show the sales by region and the sales by type. In this example, the majority of the sales occur in the west sales region and the largest type of sales is internet sales. A third panel shows results and trends of sales, inventory, and costs over the time period. A graph showing sales production by month is in a fourth panel.

Figure 9:
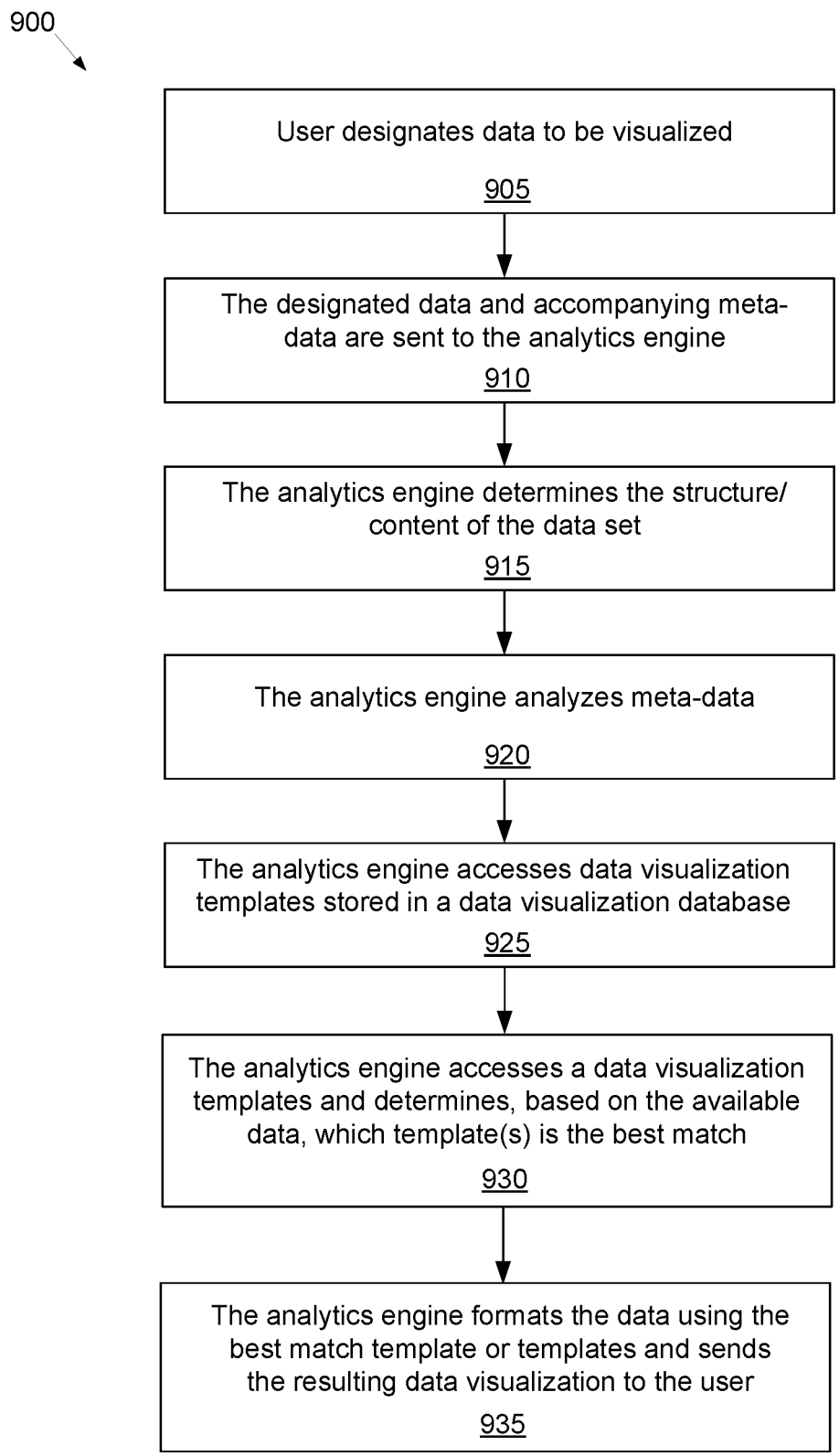
FIG. 9 is a flowchart of an illustrative method for contextual data visualization, according to one example of principles described herein.

FIG. 9 is a flow chart of a method for automatic view creation using data mining. A user designates data to be visualized (block 905). Meta-data related to the designated data is collected (block 910). As discussed above, a wide variety of meta-data can be collected through a range of mechanisms. The designated data and accompanying meta-data are sent to the analytics engine (block 915). The analytics engine determines the structure/content of the data set (block 920) to determine which type of visualizations may be most useful in presenting the data. As discussed above, if the analytics engine determines that there are only two variables in the data, a visualization could be a simple XY (scatter) chart, line chart, or bar chart. By using analytics of the data set structure, a particular visualization can be selected that would work best for the user. If the first field is non-numeric and the second field is numeric, then a pie chart could be determined to be the optimal visualization. However if there are "too many" rows to optimally display on a pie chart, a better visualization recommendation may be a horizontal bar chart or a bubble chart. Like many conditions in the automatic view creation method, how many rows are "too many rows" can be determined in a number of ways. One of the most effective ways may be to determine how the user has used pie charts in the past. If the user never uses pie charts for data sets with more than 10 rows, the analytics engine may suggest a different data visualization approach for longer data sets. Other ways of determining if a particular data set is suited to a graph type may include looking at how others in the same organization used pie charts, or what template was most popular with the entire community for similar data sets. Additionally, through analytics the title of the columns can be evaluated against other data visualizations. If the first column title is "Time", "Date", "Month", or "Quarter (1Q, 2Q)" and the second field is numeric, then a line chart could be recommended. By analyzing other user's past visualization preferences, it would be determined that Time/Date/Month field is best shown on the x-axis, and the numeric values reflected on the y-axis. Through analyzing the data set itself, significant information can be obtained that assists in the selection of an existing template, or modification of template, or the creation of a new template.

The analytics engine also analyzes the meta-data (block 925). As discussed above, the meta-data may be particularly valuable in determining a desired format for the data. The same data may be used for many purposes and the meta-data allows the analytics engine to make informed decisions about which template would be most valuable for a given circumstance. The analytics engine access the data visualization database and, using the analysis of the data and the meta-data determines which factors are most important in selecting a template. The analytics engine then scores each of the relevant templates by applying the factors and weightings from the previous analysis. The analytics engine determines which of the template(s) is the best match for the data and meta-data (block 930). The analytics engine then formats the data using the best match template or templates and sends the resulting data visualization to the user (block 935).

The method described above is only one illustrative example. The steps of the method could be reordered, replaced, combined, deleted, or additional steps could be added. For example, the user may select the desired data visualization and modify the visualization to fit their particular needs. This modified template, along with appropriate meta-data could be transmitted back to the analytics engine. The modified template is stored in the template library (125, FIG. 2) and the event is recorded in the history and preferences database (130).

Figure 10:
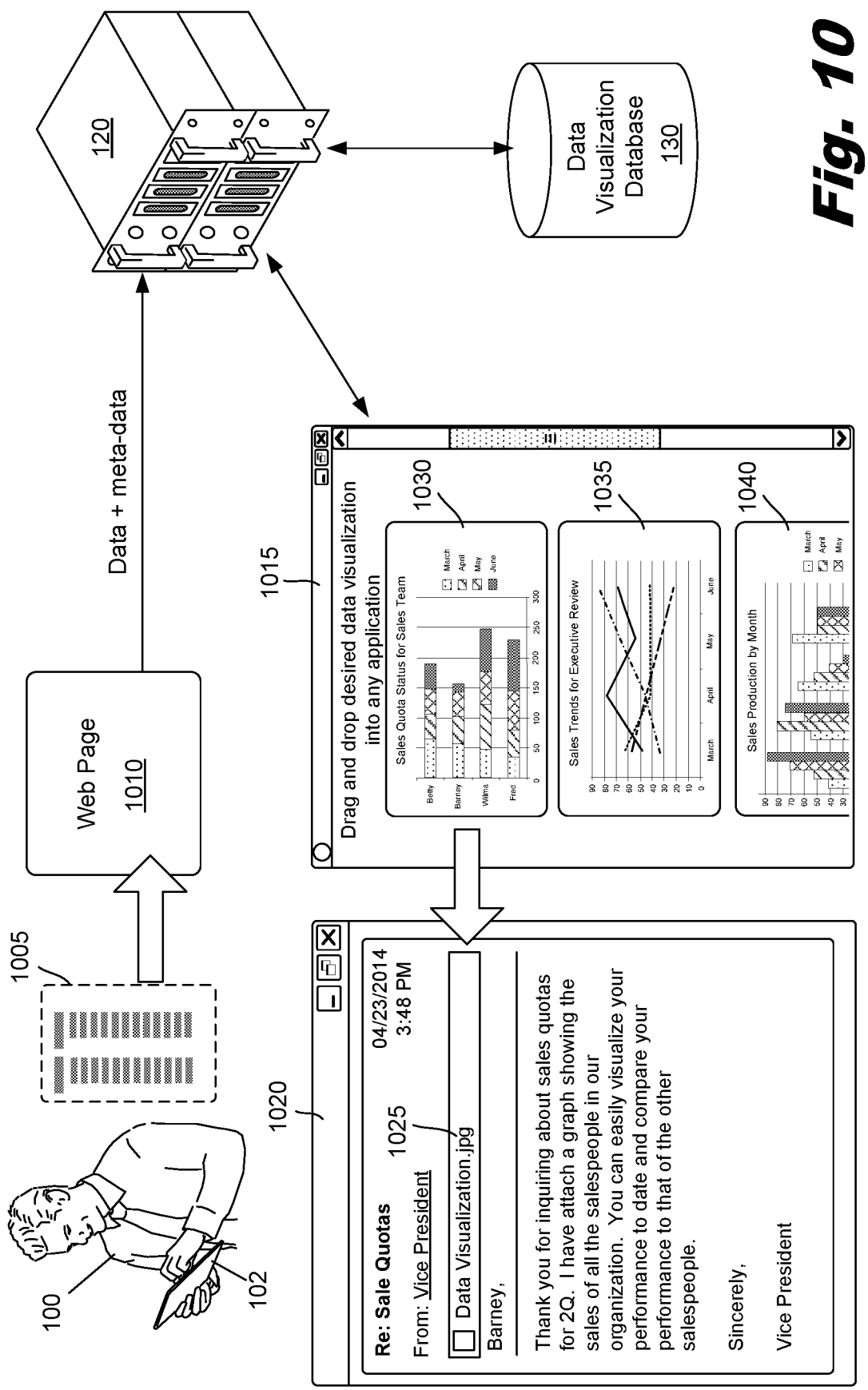
FIG. 10 is an illustrative system for contextual data visualization in which a web page acts as an interface between a user's computing device and an analytics engine, according to one example of principles described herein.

The systems and methods described above are only illustrative examples. The principles described above could be implemented in a variety of ways. FIG. 10 shows an illustrative system for contextual data visualization in which a web page (1010) acts as an interface between a user's computing device (102) and an analytics engine (120). The user (100) selects data (1005) in any of a variety of ways, including copying the data onto an electronic clipboard and pasting the data into an appropriate field of the web page (1010). The webpage (1010) transmits this data, along with available meta-data to the analytics engine (120). The process of analyzing the data and meta-data to determine which visualization template is most desirable proceeds as described above. The data visualization database (130) serves as a repository for templates and meta-data. The analytics engine (120) produces a number of data visualizations (1030, 1035, 1040) that are displayed on the webpage (1010). The user can then drag-and-drop any desired data visualization displayed on the website into any application. After the visualization is dragged into the desired application, the analytics engine (120) formats the visualization for consumption by the application. For example, if the visualization was dragged into a spreadsheet program, the analytics engine (120) would format the visualization in a native graph format in the spreadsheet and deposit the data in appropriate corresponding cells of the spread sheet. The user can then continue analyzing the data, adjusting the visualization, or request another visualization. Additionally or alternatively, the user could drag and drop the visualization into a word processing document. The analytics engine would insert the visualization into the word processing document as an appropriate image or object.

In this case, the user (100) has received an email on his mobile computing device (102) requesting a data visualization. The user drags the desired data visualization into his email application. The analytics engine attaches the data visualization to the response (1020) as a compressed image (1025). The user can then send the response to the requesting party.

Figure 11:
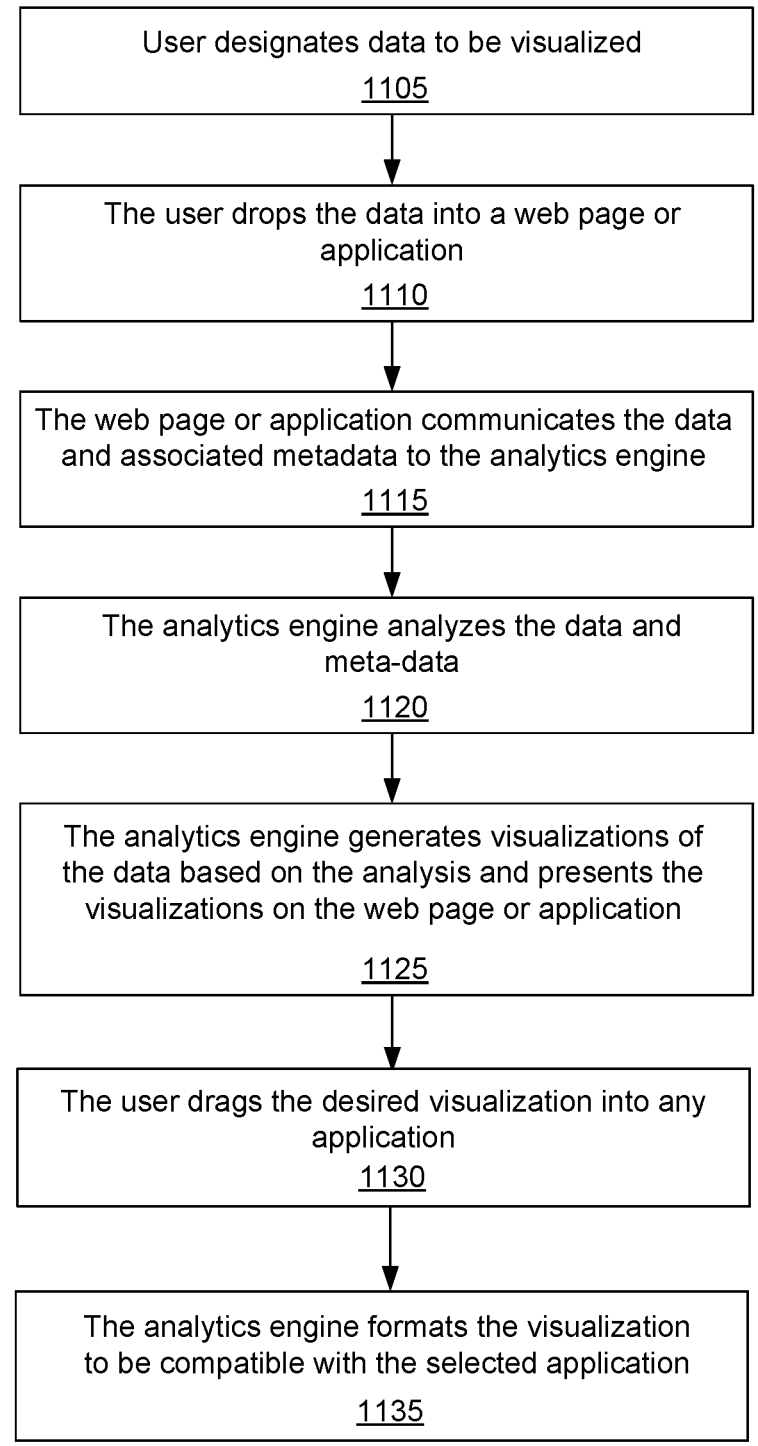
FIG. 11 is a flowchart of an illustrative method for contextual data visualization, according to one example of principles described herein.

FIG. 11 is a flowchart of an illustrative method for contextual data visualization implemented by the system described in FIG. 10. In this implementation, the user designates data to be visualized (block 1105) and then drops the data into a web page or other application (block 1110). For example, the user may select a portion of data presented in a spreadsheet or text file and drop it into the web page. Alternatively, the user may drop an entire file, file shortcut, or link into the web page.

The web page or other application accepts the data and communicates the data and associated meta-data to the analytics engine (block 1115). The analytics engine analyses the data and the meta-data (block 1120). The analytics engine generates visualization of the data based on the analysis and presents the visualizations on the web page or application (block 1125). The user drags the desired visualization into any application (block 1130). The analytics engine formats the visualization to be compatible with the selected application (block 1135).

The illustrative method described in FIG. 11 is only one example. A variety of blocks could be combined, deleted, substituted, or added. For example, the meta-data sent to the analytics engine may include information about what applications are installed and/or currently open on the user's machine. The analytics engine can then prepare the data visualization in the desired format prior to sending the visualizations to the user for selection. This may result in faster transfer times of the data visualizations to the selected application.

Figure 12:
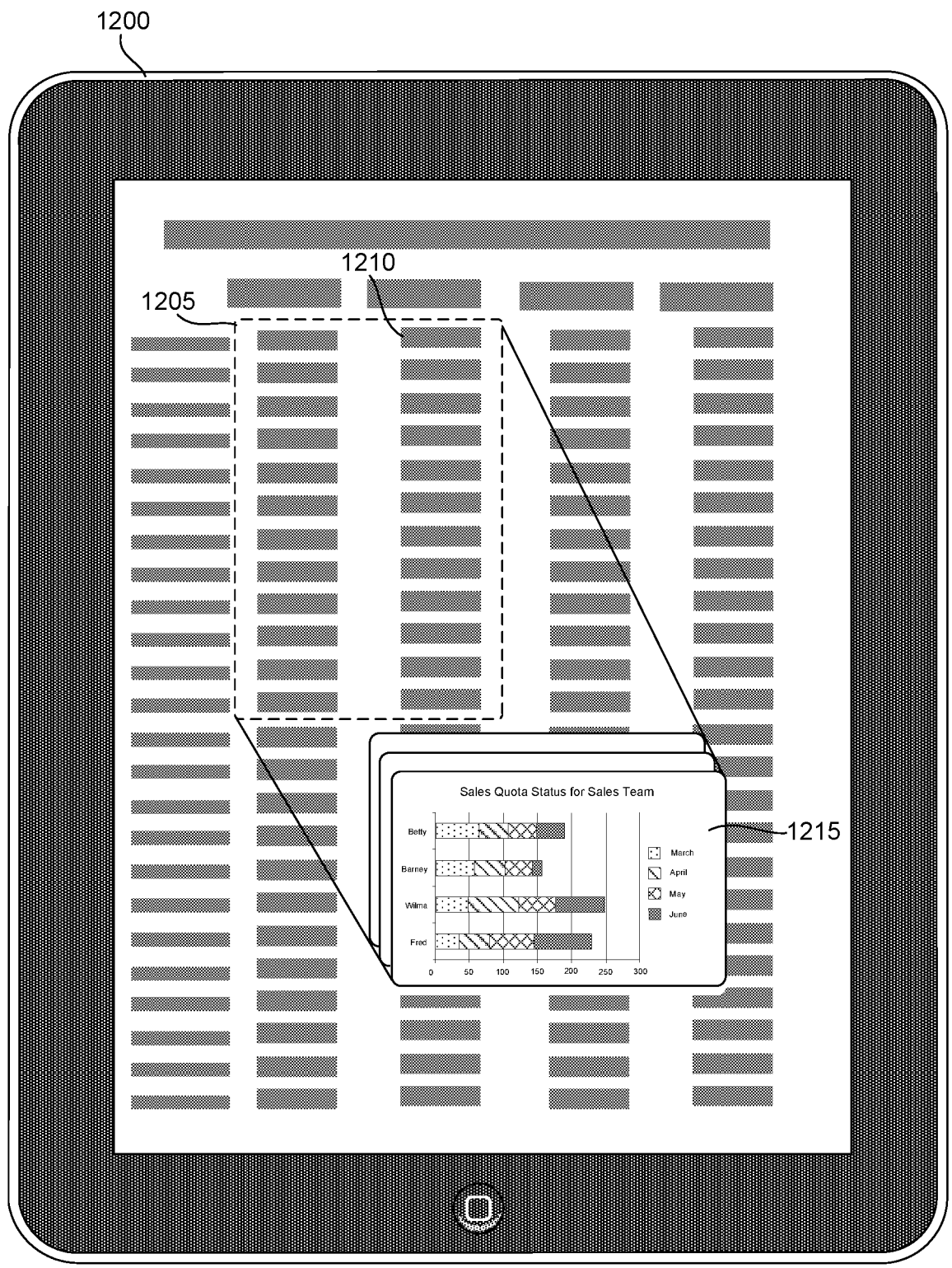
FIG. 12 is an illustrative system contextual data visualization in which an analytics engine is implemented on a user's mobile computing device, according to one example of principles described herein.

FIG. 12 is an illustrative system contextual data visualization in which an analytics engine is implemented on a user's mobile computing device (1200). In this implementation, the user simply selects (1205) the desired portion of the data (1210) and the visualizations (1215) of the data produced by the analytics engine appear next to the data.

Figure 13:
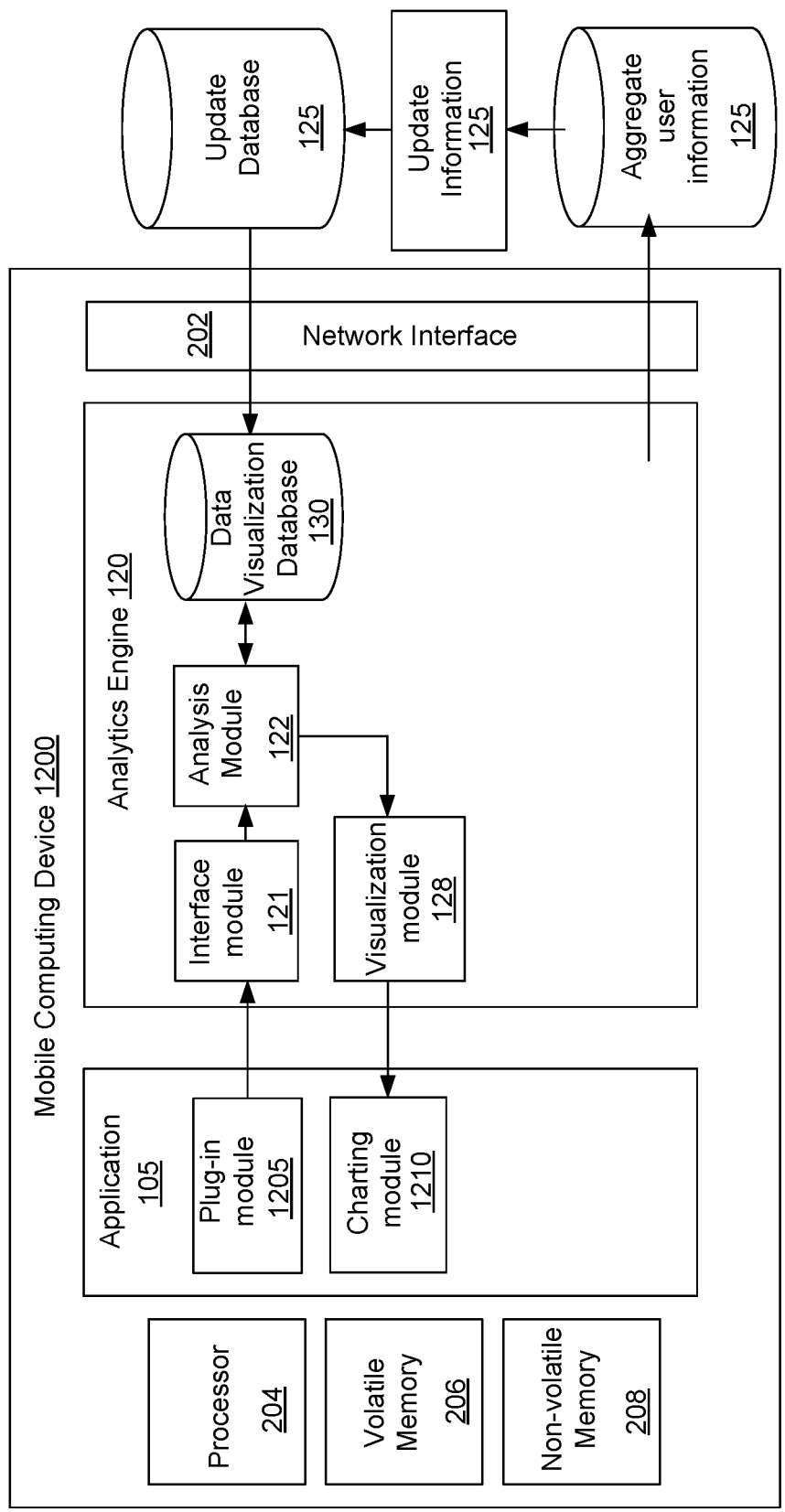
FIG. 13 is a flowchart of an illustrative method for contextual data visualization using the system described in FIG. 12, according to one example of principles described herein.

FIG. 13 shows a system diagram for an analytics engine (120) implemented in the user mobile computing device (1200) by a processor (204) and memories (206, 208). In this implementation, the analytics engine (120) interfaces directly and transparently the application (105). The application (105) includes a plug-in module (1205) that sends selected data to the interface module (121). The interface module (121) also retrieves meta-data from the application and the user's computing device (1200). For example, the user's computing device may be equipped with a GPS receiver that produces location information. The location of the computing device may be relevant to which data visualization template is used. For example, if the user is at school, different templates may be used than if the user is at work.

As discussed above, the analysis module (122) analyzes the structure and content of the data and produces weightings that are factored into the template ranking. The analysis module (122) also analyses the metadata and accesses the data visualization database (130). In this example, the data visualization database (130) is stored within computing device (1200). The analysis module (122) accesses a template database (125), also stored in the computing device (1200), and ranks the templates according to the data and meta-data weightings and passes the highest ranked templates to the visualization module (128). The visualization module (128) applies the highest ranked visualization template to the data and produces a first data visualization that is displayed to the user as a floating pop-up. If the user selects this visualization, the visualization module (128) communicates the relevant settings to a charting module within the application to create the visualization.

The user's selections and relevant meta-data about the visualization event are passed out of the analytics engine to an external database (1215) that aggregates and analyzes information from a plurality of users to identify new rules, patterns, templates, and meta-data tags. The external database (1215) produces update information (1220) that is sent to an internet accessible update database (1225). The analytics engine (120) accesses the update database (1225) to update the data visualization database (130).

In summary, the systems and methods for contextual data visualization allow for automatic generation of a visualization based on the data set structure, metadata being evaluated, and activity of the user. The visualization is selected and optimized via analysis of data visualization selection and usage from multiple users. By continually collecting information about what visualizations are used with certain data sets, the rules in the system are dynamic and constantly refined over time. This creates "dynamic" self-generation of new views based on the users profile and historical data viewed. This provides for better visualization of data with less effort from the user. This can be particularly useful where the user accesses the data using a mobile computing device that may lack input peripherals and large amounts of computing power.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Having thus described the invention of the present application in detail and by reference to embodiments thereof, it will be apparent that modifications and variations are possible without departing from the scope of the invention defined in the appended claims.

What is claimed is:

1. A method comprising:
receiving data selected by a user and meta-data associated with the data;
receiving, from the user, an indication of in which application a data visualization will be presented;
analyzing the data, using a processor of a computing device, to determine content and structure attributes of the data that are relevant to visualization of the data;
analyzing the meta-data, using a processor of the computing device, to determine a context in which the visualization of the data will be used;
accessing a database comprising an aggregation of visualization records from a plurality of users;
selecting, based on a use history of the user, at least one template from the visualization records that matches the data attributes and context; and
creating the data visualization by applying the at least one template to the data.

2. The method of claim 1, further comprising creating a plurality of data visualizations by applying templates from the database that most closely match the data and meta-data.

3. The method of claim 2, further comprising displaying the plurality of data visualizations to the user for selection.

4. The method of claim 3, further comprising receiving from the user an indication of which of the data visualizations the user has selected.

5. The method of claim 1, in which creating a data visualization comprises communicating settings to an application on the user's computing device.

6. The method of claim 1, in which the analyzing the structure and content attributes of the data comprises determining how many rows and columns are in the data and which portions of the data are numeric or alphanumeric.

7. The method of claim 1, in which receiving data selected by a user comprises receiving data dragged by the user into an input of the processor from a data source.

8. The method of claim 1, in which receiving data selected by a user comprises receiving data dragged by the user into a web page or application from different source.

9. The method of claim 1, in which creating a data visualization by applying the at least one template to the data comprises selecting a data format that is compatible with the indicated application in which a data visualization will be presented.

10. The method of claim 1, in which:
analyzing the meta-data to determine a context in which the visualization of the data will be used comprises determining an identity of the user; and
accessing a template database comprises selecting templates that are marked as having been previously used by the user.

11. The method of claim 1, in which the meta-data comprises information identifying an audience of the data visualization.

12. The method of claim 11, in which selection of the at least one template comprises selection of a template that are marked as having been previously been presented to the audience.

13. The method of claim 1, further comprising recording use of templates stored in the database by a plurality of users by recording: characteristics of visualizations used by the plurality of users, characteristics of the data supplied by the plurality of users and meta-data in visualization requests received from the plurality of users.

14. The method of claim 1, further comprising generating visualization best practices based on visualization records by the plurality of users stored in the database.

15. The method of claim 1, further comprising transmitting and recording post generation meta-data, the post generation meta-data comprising a record of how the user modified and used the data visualization, the post generation meta-data being stored in the database.

16. The method of claim 15, further comprising generating a new template from the post generation meta-data, the new template being tagged with the identity of the user and audience of the data visualization.

17. The method of claim 1, wherein selecting the at least one template is further based on a ranking of templates in the database, the ranking based on at least one of:
data fields of the data in the visualization request;
data types of the data in the visualization request;
titles associated with the data in the visualization request;
historical use of a template;
user preference;
a recency of use of a template; and
a degree of correspondence between the data and meta-data in the visualization request from the user and data and meta-data associated with the templates.

18. An analytics engine comprising:
a computer processor and a memory accessible by the computer processor;
an interface module for receiving a data visualization request from a user, the data visualization request comprising data and meta-data describing a context of the request; and
a database comprising records of previous data visualizations by multiple users, each record comprising: templates, descriptions of data visualized, and meta-data associated with the data;
wherein the processor is programmed to:
receive data selected by a user and meta-data associated with the data;
analyze the data to determine content and structure attributes of the data that are relevant to visualization of the data;
analyze the meta-data to determine a context in which the visualization of the data will be used, wherein the context indicates a role of the user, an intended audience of the visualization of the data, and a role-based task of the user;
access the database and select, based on a use history of the user, at least one template from the visualization records of the database that matches the data attributes and context; and
create a data visualization by applying the at least one template to the data.

19. A computer program product for contextual data visualization, the computer program product comprising:
a non-transitory computer readable storage medium having computer readable program code embodied therewith, the computer readable program code, when executed by a processor, causing the processor to:
receive data selected by a user and meta-data associated with the data;
receive, from the user, an indication of in which application a data visualization will be presented;
analyze the data to determine content and structure attributes of the data that are relevant to visualization of the data;
analyze the meta-data to determine a context in which the visualization of the data will be used;
access a database comprising an aggregation of visualization records from a plurality of users;
select, based on a use history of the user, at least one template from the visualization records of the database that matches the data attributes and context; and
create the data visualization by applying the at least one template to the data.

20. The computer program product of claim 19, wherein causing the processor to create the data visualization includes causing the processor to select a data format that is compatible with the indicated application in which a data visualization will be presented.

* * * * *